UNITED STATES PATENT OFFICE.

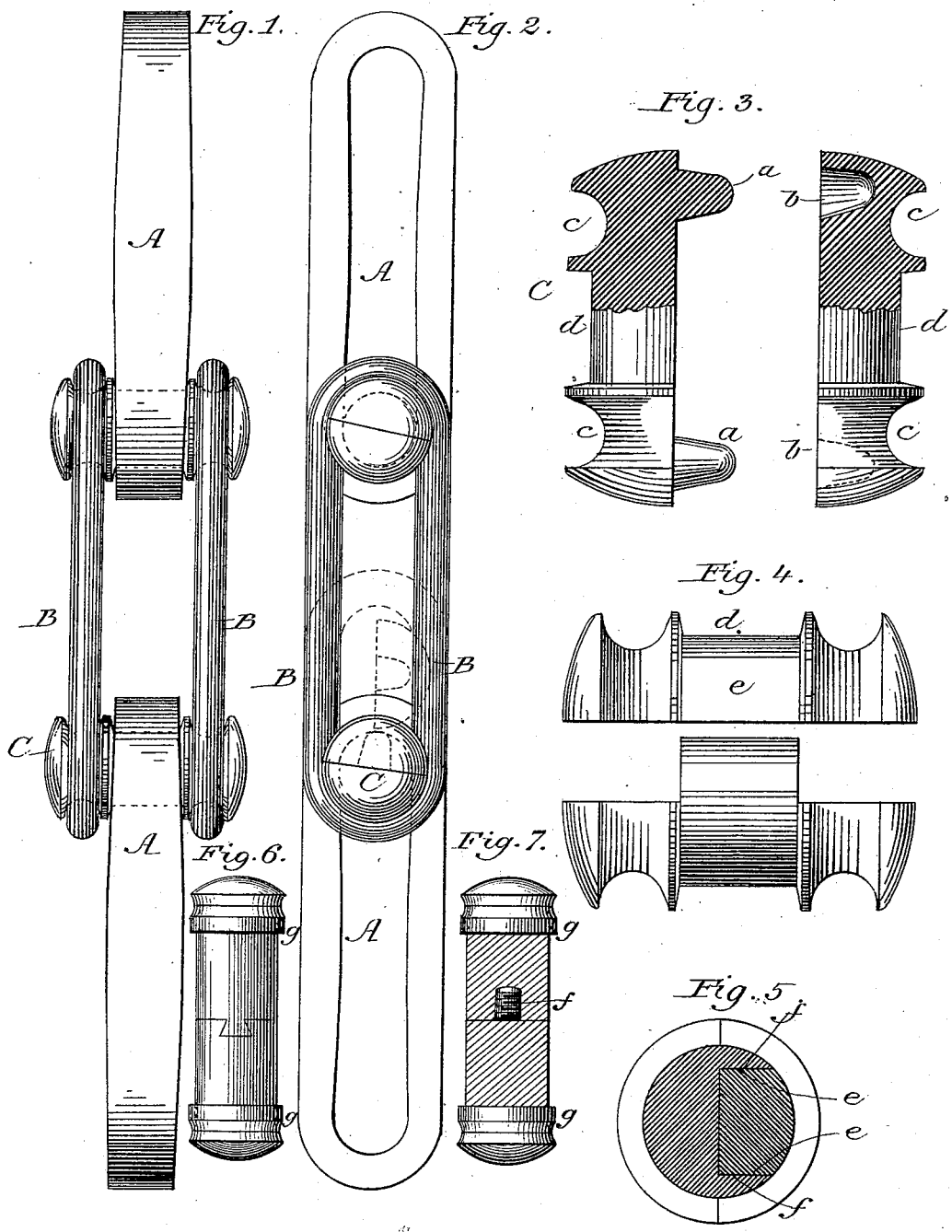

EUGENE L. HOWE, OF CHICAGO, ILLINOIS.

DRIVE-CHAIN.

SPECIFICATION forming part of Letters Patent No. 304,325, dated September 2, 1884.

Application filed September 25, 1882. (Model.)

*To all whom it may concern:*

Be it known that I, EUGENE L. HOWE, a citizen of the United States, residing in Chicago, county of Cook, and State of Illinois, have invented certain new and useful Improvements in Drive-Chains, of which the following is a specification.

My invention relates to improvements in drive-chains having detachable links, and which, by their peculiar construction, are adapted to be made very heavy to withstand severe strains, whether employed upon sprocket-wheels or otherwise; and the objects of my invention are to provide a pivot connecting the links and forming their bearing, which pivot is made of sections adapted to be detachably and removably connected together and to the links in such a manner that the sections cannot become accidentally detached after being joined in their operative position in the links, and which cannot be removed from or inserted in the links without first being detached; to provide a removable pivot detachably connecting the links of a drive-chain, which pivot has independent bearings for the several links mounted thereon; and, finally, to provide a drive-chain with a two-part pivot detachably connecting the links, one of which parts is overlapped and held by the other, so that when the parts are joined they may be rigidly and permanently connected together to form substantially a solid undivided pivot in the ordinary usage of the chain, but which may be by special force separated. I attain these objects by devices illustrated in the accompanying drawings, in which—

Figure 1 is a plan view of a section of a drive-chain embodying my invention; Fig. 2, a side elevation of the same, with dotted lines indicating the position of the links and the two-part pivot when attaching or detaching the links; Fig. 3, a side elevation, partly in section, of the pivot when its two parts are detached; Fig. 4, a plan view of a modification of the two-part pivot, and Fig. 5 a central transverse section of the same. Fig. 6 represents a partly longitudinal section of another form of my invention, in which the pivot is transversely divided and joined by screw-threaded bolts; Fig. 7, still another form, in which the transversely-divided pivot is dovetailed together.

Similar letters of reference indicate the same parts in the several figures of the drawings.

A A represent two elongated open links, arranged in alignment with each other, and composed of flat metal, and B B are two open and elongated links, arranged parallel with each other, and composed of round metal, and it is between these round links that the teeth of a sprocket-wheel are designed to operate. Connecting these links is a pivot, C, which works in the rounded bearing in the link A and in the corresponding bearings of the links B B, between which the link A projects in its operation on the pivot. This pivot, as clearly shown in Fig. 3, is round in cross-section, and is composed of two parts—that is to say, is divided longitudinally—and one of these parts is provided with studs *a a*, and the other correspondingly recessed at *b b*, to receive the studs, the studs fitting closely but removably in their respective recesses, and serving as guides in joining the two parts, so as to present the appearance of a solid pivot, and preventing their accidental detachment when the pivot is in its operative position. To prevent a lateral movement of the several links on the pivot and avoid friction of the links against each other, the pivot is provided with distinct bearings *c c*, for the parallel round links, and a central bearing, *d*, for and corresponding with the flat link A, which several bearings may be cast or turned in the pivot, as desired.

To connect the links and pivot in their operative position to form a chain, links B B are held parallel to each other, as shown in Fig. 1, and link A moved forward between the links B B, as shown in dotted lines in Fig. 2, or vice versa, when the studded half of the link C is inserted between the links with the studs up, the link B from the side on which the pivot is inserted being slightly raised to engage the bearing *c* with the link, when the stud is free to pass outside the raised link, after which this studded half of the pivot is turned on its edge, as shown in dotted lines in Fig. 2, bringing the studs in a line substantially parallel with the sides of the links, and in this position the recessed half of the pivot is inserted between the links, as indicated in dotted lines, then turned on its edge and pushed to place against the studed half, and the link A drawn forward to the position shown in Fig. 1.

In Figs. 4 and 5 is shown a modification of the pivot, which is also in two parts, one of which parts is cut away at *e* in the central bearing on each side, and in a line at a right angle to its flat inner face, and the other part provided with corresponding tongues overlapping the parallel edges *e e* of the other half of the pivot when the two parts are joined, so as to form a continuous bearing, *d*, for the link A, and join the two parts of the pivot together to form a substantially solid pivot. The joint between the two parts of the pivot may be made so nicely that when the parts are forced together they will adhere to each other under the roughest usage; a chain may sustain, but as malleable iron or other soft metal is preferred in the construction of these pivots, the sides *e e* are preferably converged toward the rounded bearing or the surface of the pivot, so that after the two parts are joined, by striking a slight blow upon the tongues, the parts will be rigidly joined, and cannot be detached until one of the tongues is spread by the employment of an edged instrument to pry or force the two parts asunder. While both flat and round links are shown as alternately employed in making up the chain, it is obvious that the one or the other might be employed to the exclusion of the other, as desired, without departing from the spirit of my invention. So, also, the distinct bearings on the pivot may be omitted, though of course it is admitted that the pivot should have heads, flanges, or end projections of some kind to confine the several links against lateral detachments. Nor is my invention limited to the manner shown and described of dividing and connecting the two parts of the pivot together, for they may be divided transversely instead of longitudinally, and in either case be further held by a collar sleeved upon them— as, for instance, as shown in Fig. 6, a transverse division of the pivot is made, and the two parts joined by a screw-threaded bolt, *f*, on the end of one part fitting in a corresponding recess in the other. So, also, a transversely divided pivot may have its parts connected by dovetailing, as shown in Fig. 7. In either of these or any transverse division, collars *g g* are preferably employed, which operate both as bearings for the parallel links and as washers between these and the single links, and are slipped on the pivots after being inserted in the links, before being joined; and some convenient means should be provided to lock the parts against accidental loosening or detachment—as, for example, a small tongue, *h*, contiguous with one part and bent down into a corresponding recess in the other after the parts are properly joined, or by having two opposing recesses filled with soft metal, which, like the tongue, can be readily removed from one recess when it is desirable to detach the pivot from the links.

It will thus be seen that as my invention includes, broadly, a divided pivot in a detachable link-chain, the pivot may be divided and joined in any suitable manner adapted to prevent their accidental detachment when in their operative positions, or by slacking of the chain.

Having described my invention, what I claim, and desire to secure by Letters Patent, is—

1. The combination, with the links of a chain, of connecting-pivots, each composed of two parts locked together and adapted to be detached entirely from said links, substantially as described.

2. The combination, with the links of a chain, of connecting independent removable pivots composed of longitudinally-divided sections, the two parts adapted to be connected together and locked when the chain is in operation, substantially as described.

3. The combination, with the links, of a pivot having an independent bearing therein, said pivot being composed of two parts, one of said parts carrying lugs, and the other part recessed to receive the lugs, substantially as and for the purpose described.

4. In a drive-chain, the combination, with independent parallel links and single links projecting and operating between the extremities of the parallel links, of divided pivots having independent bearings in and connecting said links together, all arranged substantially as described.

5. In a drive-chain, the combination, with the parallel links and single links projecting and operating between the parallel links, of a loose two-part pivot and suitable locking devices therefor, said pivot being provided with distinct bearings for the links, and detachably connecting the links together, substantially as described.

In witness whereof I have hereunto affixed my hand this 19th day of September, A. D. 1882.

EUGENE L. HOWE.

Witnesses:
JNO. G. ELLIOTT,
W. W. ELLIOTT.